(12) United States Patent
Breh et al.

(10) Patent No.: US 8,856,155 B2
(45) Date of Patent: Oct. 7, 2014

(54) MANAGEMENT OF CONFIGURATION DATA STRUCTURES IN MULTI-LAYER DATA MODELS

(75) Inventors: Jochen Breh, Boeblingen (DE); Dirk Hillmer, Zurich (CH); Thomas Spatzier, Boeblingen (DE); Jeremais Werner, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 13/198,500

(22) Filed: Aug. 4, 2011

(65) Prior Publication Data

US 2012/0102075 A1 Apr. 26, 2012

(30) Foreign Application Priority Data

Oct. 25, 2010 (EP) .................................. 10188746

(51) Int. Cl.
*G06F 7/00* (2006.01)

(52) U.S. Cl.
USPC .......................................... 707/756; 708/204

(58) Field of Classification Search
USPC .................. 707/756; 708/204, 205, 206, 442; 379/88.13, 88.14, 93.14, 93.15, 142.14
See application file for complete search history.

(56) References Cited

U.S. PATENT DOCUMENTS

| 5,950,201 | A | * | 9/1999 | Van Huben et al. | 1/1 |
| 6,493,717 | B1 | * | 12/2002 | Junkin | 707/754 |
| 7,668,943 | B2 | | 2/2010 | Liu | |
| 2005/0187940 | A1 | * | 8/2005 | Lora et al. | 707/10 |
| 2008/0126221 | A1 | * | 5/2008 | Swanson | 705/26 |

* cited by examiner

*Primary Examiner* — James Trujillo
*Assistant Examiner* — Linh Black
(74) *Attorney, Agent, or Firm* — Zilka-Kotab, PC (57) ABSTRACT

In one embodiment, a computer program product includes a computer readable storage medium having computer readable program code embodied therewith, the computer readable program code being configured to: map a template-level configuration-management data structure to a discovery-level configuration-management data structure by a first mapping using mapping information included in the template-level configuration-management data structure, map a customized-level configuration-management data structure to the discovery-level configuration-management data structure by a second mapping using mapping information included in the customized-level configuration-management data structure, and determine a third mapping between the template-level configuration-management data structure and the customized-level configuration-management data structure using the first mapping and the second mapping.

16 Claims, 7 Drawing Sheets

MANAGEMENT OF CONFIGURATION DATA STRUCTURES IN MULTI-LAYER DATA MODELS

RELATED APPLICATIONS

The present application claims priority from a European Patent Application filed with the European Patent Office on Oct. 25, 2010 under application number 10188746.1, which is herein incorporated by reference in its entirety.

BACKGROUND

The invention relates to a method for management of configuration data structures of computing resources, and specifically to a mapping engine for management of configuration-management data structures of computing resources.

Today, more complex interrelated computing systems typically used in data centers are managed with tools, often referred to as systems-management tools or systems-management systems. Enterprises often use a piecemeal approach to systems-management. Single systems-management systems may be used for dedicated systems-management tasks. Dedicated systems-management tools may have enterprise templates and policies (e.g., for security, accounting information, and/or specific user information).

However, in more complex virtualized computing environments having hundreds of physical systems, and even more virtual systems, a centralized approach to systems-management is recommended by industry specialists.

On the other side, configuration-management data in systems-management is often located in different data stores (e.g., discovery data, authorized data managed by processes, service templates, automation data, etc.). This data is often not consistently synchronized, but consistency across all the locations of the data is important to allow for a consistent systems-management across all layers.

While it is possible to keep data models of the configurations consistent when changes are driven from one layer, reconciling changes that occur at different times in different layers proves to be problematic using conventional systems and methods. In addition, discovery of already deployed systems using information in a high-level service automation model is not possible using conventional systems and methods. Additionally, intermediate level models are potentially unknown at the time of designing service templates.

In a typical situation, an enterprise may use configuration-management data of a customized abstraction model layer. Additionally, an information layer of a highest level detail called a discovery layer may be present, representing information collected from various computing components managed via a systems-management tool. This data may be collected by agents as part of the systems-management system.

If during an expansion of the data center or a switch to a more systematic approach to systems-management, a systems-management system with more capabilities and typical abstract system configurations and templates may be implemented, but there may be a missing link between the most abstract layer newly brought to a data center and an already existing customized abstraction model layer.

BRIEF SUMMARY

In one embodiment, a method for configuring management data structures of computing resources includes mapping a template-level configuration-management data structure to a discovery-level configuration-management data structure by a first mapping using mapping information included in the template-level configuration-management data structure, mapping a customized-level configuration-management data structure to the discovery-level configuration-management data structure by a second mapping using mapping information included in the customized-level configuration-management data structure, and determining a third mapping between the template-level configuration-management data structure and the customized-level configuration-management data structure using the first mapping and the second mapping.

In another embodiment, a system includes a mapping engine for management of configuration-management data structures of computing resources, the mapping engine including logic adapted for mapping a template-level configuration-management data structure to the discovery-level configuration-management data structure by a first mapping using mapping information included in the template-level configuration-management data structure, logic adapted for mapping a customized-level configuration-management data structure to the discovery-level configuration-management data structure by a second mapping using mapping information included in the customized-level configuration-management data structure, and logic adapted for determining a third mapping between the template-level configuration-management data structure and the customized-level configuration-management data structure using the first mapping and the second mapping, wherein the configuration-management data structures are characterized by having different abstraction levels, and wherein each of the configuration-management data structures comprise at least one configuration-management data structure component not available in the other configuration-management data structures.

In yet another embodiment, a computer program product includes a computer readable storage medium having computer readable program code embodied therewith, the computer readable program code being configured to: map a template-level configuration-management data structure to a discovery-level configuration-management data structure by a first mapping using mapping information included in the template-level configuration-management data structure, map a customized-level configuration-management data structure to the discovery-level configuration-management data structure by a second mapping using mapping information included in the customized-level configuration-management data structure, and determine a third mapping between the template-level configuration-management data structure and the customized-level configuration-management data structure using the first mapping and the second mapping.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of systems, methods, and computer program products for management of configuration data structures of computing resources in order to keep the configuration data structures consistent when changes are driven from one layer, thereby reconciling changes that occur at different times in different layers and allowing for the discovery of already deployed systems using information in a high-level service automation model.

In particular, the management of configuration-management data structures may be a discovery and reconciliation of configuration-management data structures between different configuration-management data structures of different abstraction layers, in one embodiment.

This need may be addressed by a method for management of configuration-management data structures of computing resources, a mapping engine, a systems-management system, a computer system, a data processing program, and/or a computer program product, according to several embodiments.

In one general embodiment, a method for configuring management data structures of computing resources includes mapping a template-level configuration-management data structure to a discovery-level configuration-management data structure by a first mapping using mapping information included in the template-level configuration-management data structure, mapping a customized-level configuration-management data structure to the discovery-level configuration-management data structure by a second mapping using mapping information included in the customized-level configuration-management data structure, and determining a third mapping between the template-level configuration-management data structure and the customized-level configuration-management data structure using the first mapping and the second mapping.

In another general embodiment, a system includes a mapping engine for management of configuration-management data structures of computing resources, the mapping engine including logic adapted for mapping a template-level configuration-management data structure to the discovery-level configuration-management data structure by a first mapping using mapping information included in the template-level configuration-management data structure, logic adapted for mapping a customized-level configuration-management data structure to the discovery-level configuration-management data structure by a second mapping using mapping information included in the customized-level configuration-management data structure, and logic adapted for determining a third mapping between the template-level configuration-management data structure and the customized-level configuration-management data structure using the first mapping and the second mapping, wherein the configuration-management data structures are characterized by having different abstraction levels, and wherein each of the configuration-management data structures comprise at least one configuration-management data structure component not available in the other configuration-management data structures.

In yet another general embodiment, a computer program product includes a computer readable storage medium having computer readable program code embodied therewith, the computer readable program code being configured to: map a template-level configuration-management data structure to a discovery-level configuration-management data structure by a first mapping using mapping information included in the template-level configuration-management data structure, map a customized-level configuration-management data structure to the discovery-level configuration-management data structure by a second mapping using mapping information included in the customized-level configuration-management data structure, and determine a third mapping between the template-level configuration-management data structure and the customized-level configuration-management data structure using the first mapping and the second mapping.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the context of this application, the following principle terms have been used, which have the following definitions:

Systems Management—This term may denote an enterprise-wide administration of distributed systems comprising computers, networks, and storage systems as well as software, such as operating systems, middleware, and end user applications. Systems management may strongly be influenced by network management components in telecommunications. Systems management is typically performed using software and/or dedicated hardware called systems-management systems. Systems-management systems may collect data about the actual status of a network of computing resources and may—in many cases remotely—control some or all functions of the entire network of computing resources.

Configuration-management data structure—This term may denote a data structure used for systems-management tasks. There may be different levels of abstraction of the configuration-management data structures forming different data models. It should be noted that topologies comprised and detailed in the data structures may be of interest. Also, comprised automation model information may have less importance than topology information data structures and data.

Computing resources—This term may denote any computing system, along with any related software. This may include server computers, personal computers (PCs), workstations, smart phones, personal digital assistants (PDAs), tablets, network switches, storage systems, printers, scanners, etc. Also, virtual machines and other software systems, like middleware and applications, may be treated as computing resources. Basically, a complete infrastructure of an enterprise's resources, commonly managed out of a data center, may comprise computing resources.

Template level—This term may denote a most abstract layer of configuration-management data structures. It may be designed within a comprehensive systems-management system addressing known and future requirements for systems-management tasks. Based on this level of configuration-management data, service instances of services, e.g., virtual machines, may be instantiated. Generally, services to the business side of an enterprise may be provided. Data on this level may usually be used for and by tools implementing automated systems-management processes.

Customized level—This term may denote an abstract, authorized level of configuration-management data structures. It may represent an information base for systems-management processes, like information technology infrastructure library (ITIL) in a specific enterprise. It may be used by manual, semi-manual, or automatic tools often specific for an enterprise. This data may be a customer subset of actual configuration-management data at an even lower level, e.g., a discovery level. End-users usually decide what may be used in their environment in a customized-level configuration-management data structure.

Discovery level—This term may denote a lowest abstraction level in the context of this application. It relates to actual configuration data of physical systems and software in a network of computing resources. This level may be standardized in various ways. There may be hundreds of classes describing physical systems, such as computers, CPUs, storage devices, storage adapters, networks, network adapters, etc. The data relating to the configuration-management data structures of the discovery level may be generated by (software) agents collecting relevant data, and sending the data to a data store for configuration-management data sets. This may be a part of a systems-management tool. The sending may be based on event notification mechanisms or other asynchronous communication mechanisms.

Abstraction level—Abstraction, and in particular abstraction level of a data structure—may denote different levels of detail in each level. A highest level abstraction model and its associated data model, e.g., a template level, may use only a few terms describing a server system, while at a lowest level, e.g. a discovery level, many parameters may be used to fully describe a server system. At the discovery level, computing system manufacturer, clock speed, adapter address, cache sizes, etc., may be relevant. At a template level, only a general architecture and core elements of the capacity may be relevant. A customized level may be positioned between the template level and the discovery level in terms of details in the data model or data structure. However, a simple 1:n mapping is seldom possible. The mappings may be more complex. In one data model, a data component of the data structure may be named "number of CPUs" while in another data model the same abstract idea may be coded in a field named "numCPU," for example. A mapping prefers to resolve those different terms in order to correctly position variables and parameters.

Beside such a simple non-correlation, it may well be the case that a data structure component in one data structure may not be available in another data structure of a different abstraction layer. A mapping mechanism may also take care of this situation.

Mapping—The term mapping may denote an action to map one data structure to another. The data structures are typically not identical, and the mapping takes this into account. A set of rules may be used in order to relate different fields of different abstraction levels to each other. The mapping may also combine a number of fields of a data structure and then do a mapping to the other data structure. Generally speaking, a set of mathematical functions, e.g., in the form of a matrix, may be preferred to express the complete mapping comprising a set of detailed, specific mapping rules.

The above-described method for management of configuration data structures of computing resources offers some advantages over currently used methods and systems.

The highest-level service-automation model (the template-level configuration-management data structure) may be annotated with mapping information that may express how this model may relate to a configuration-management data structure of a lowest-level discovery model or level. This is possible since both models may be known at service design time. The mapping may be kept independent of potential customer-specific intermediate models, i.e., customized-level models. The mapping may comprise a function projecting many configuration-management data structure components to just one or a low number of template-level configuration-management data structure components.

At a specific customer site, mapping information between the lowest-level (discovery-level) configuration-management data structure and a customer-specific authorized model (e.g., customized-level configuration-management data structure) may be used to calculate a relationship between the highest-level service automation model (e.g., the template-level configuration-management data structure) and the customer-specific model (e.g., the customized-level configuration-management data structure). Using this method, analysis and management of already existing systems may be possible, including the aggregation of data from several layers of data models into one consistent top level representation of IT services, even if a top-level systems-management system is introduced after the existence of a customized-level configuration-management data structure. Manual, error prone, time consuming, and in many cases impossible mapping is no longer required, thus improving automation quality and reliability of IT systems. When used in the context of cloud computing and a high degree of automation of IT resource provisioning, this is a clear advantage if compared to the state-of-the-art.

In one embodiment, a method for configuring management data structures of computing resources includes: mapping a template-level configuration-management data structure to a discovery-level configuration-management data structure by a first mapping using mapping information included in the template-level configuration-management data structure, mapping a customized-level configuration-management data structure to the discovery-level configuration-management data structure by a second mapping using mapping information included in the customized-level configuration-management data structure, and determining a third mapping between the template-level configuration-management data structure and the customized-level configuration-management data structure using the first mapping and the second mapping.

In one approach, the method may also include managing the configuration-management data structures in a systems-management system.

In an alternative approach, the method may also include storing configuration-management data structures to a server system.

In another approach, the method may also include storing configuration-management data structures and related data in a configuration-management database.

In another approach, each of the configuration-management data structures includes at least one component not available in the other configuration-management data structures.

In some approaches, the method may include defining at least one service instance based on data in the template-level configuration-management data structure.

In a further approach, the discovery-level configuration-management data structure is standardized based on a recognized standard.

In other instances, the method may employ a recognized standard which may be based on a common information model distributed by an organization which develops standards for use by information technology entities.

According to another embodiment, the method may allow a consistent view and easy management of an entire IT landscape of one or more enterprises.

In another embodiment, the method may comprise storing the configuration-management data structures on a server system. In this case, all or some data and data structures may easily be stored in one consistent database on the server system for all data and related structures of a systems-management system.

A further embodiment of the method may comprise storing the configuration-management data structures and related data in a configuration-management database. In particular, the configuration-management data structures and related data may be stored in a database according to a known configuration-management database (CMDB) standard. Such a database may be implemented in the form of the IBM® Tivoli systems-management product Change and Configuration Management Database (CCMDB), in one approach. A delivery of discovery-level data may be sent to the configuration-management data structures and stored. Because all configuration-management data structures of all different levels may be stored in the same database, a multi-layer data structure may be used, in some approaches.

In yet another embodiment, the method may comprise defining at least one service instance based on data in the template-level configuration-management data structure. In this way, the systems-management system, based on the template-level configuration-management data structure, may easily influence and manage existing IT infrastructures.

In again another embodiment, the method may comprise that the discovery-level configuration-management data structure are standardized. Such standardization may make a comparison of basic IT topology elements realistic.

In again another embodiment of the method, the standardization may be based on the Common Information Model, in particular on version 2.26.0 of the Distributed Management Task Force (DMTF).

Alternatively, in another embodiment of the method, the standardization may be based on a Common Data Model defined by the IBM® Tivoli product, in particular version 2.10.13 or later.

The method according to any of the preceding claims, wherein the mappings apply a meta language describing relationships between the different configuration-management data structure components of different levels.

In another embodiment, a systems-management system may comprise the mapping engine of managing configuration-management data structures of computing resources.

Furthermore, a computer or computer system may comprise the mapping engine, as described above, and referring to the method of managing configuration-management data structures of computing resources. The mapping engine may also be implemented as a component of a systems-management system, which may be part of a computer system.

It should be noted that embodiments may take the form of an entire hardware implementation, an entire software embodiment or an embodiment containing both, hardware and software elements. In a preferred embodiment, the invention is implemented in software, which includes, but is not limited to, firmware, resident software and microcode.

In one embodiment, a data processing program for execution in a data processing system is provided comprising software code portions for performing the method, as described above, when the program is run on a data processing system. The data processing system may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may include storage, communication, propagation or transportation of the program for use, by or in a connection with the instruction execution system, apparatus, or device.

Of course, this logic may be implemented as a method on any device and/or system or as a computer program product, according to various embodiments.

Figure 1:
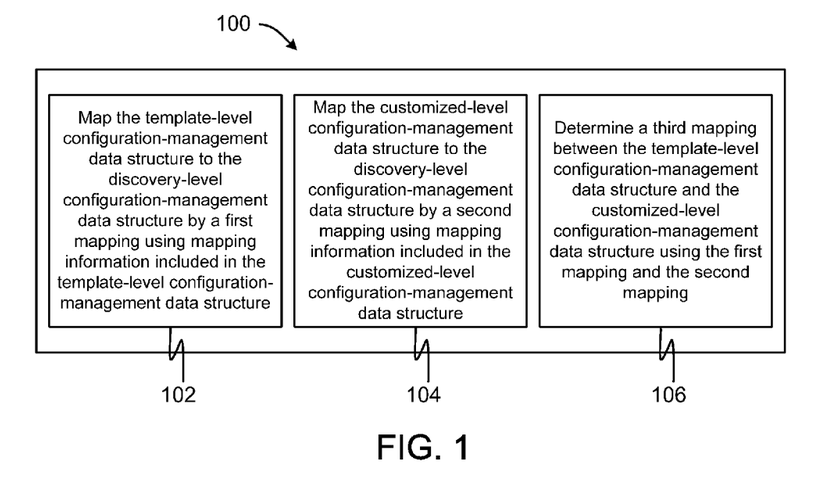
FIG. 1 shows a block diagram of one embodiment of a method.

Referring now to the figures, FIG. 1 shows a block diagram of an embodiment of the method 100 of management, data structures of computing resources. The configuration-management data structures may have different abstraction levels. In particular, the method may be a method of identification and reconciliation of configuration-management data of computing resources. The abstraction levels may comprise at least a template-level, a customized-level and a discovery-level. Each of the configuration-management data structures may comprise at least one configuration-management data structure component not available in the other configuration-management data structures. The method may comprise mapping, 102, the template-level configuration-management data structure to the discovery-level configuration-management data structure by a first mapping using mapping information included in the template-level configuration-management data structure, mapping 104 the customized-level configuration-management data structure to the discovery-level configuration-management data structure by a second mapping using mapping information included in the customized-level configuration-management data structure, and determining 106 a third mapping between the template-level configuration-management data structure and the customized-level configuration-management data structure using the first mapping and the second mapping.

Figure 2:
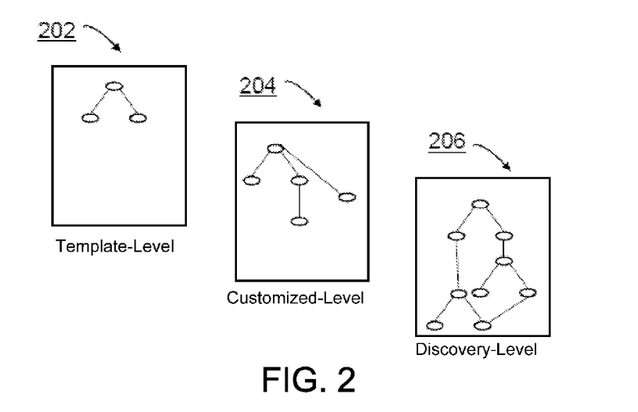
FIG. 2 shows different level of configuration-management data structures, according to one embodiment.

FIG. 2 illustrates embodiments of configuration-management data structures of different abstraction levels. Block 202 may illustrate a template-level configuration-management data structure having just little details. Block 204 may illustrate a customized-level configuration-management data structure having more details, in particular additional components. Block 206 may illustrate a discovery-level configuration-management data structure having the highest number of details and potential dependencies.

Figure 3:
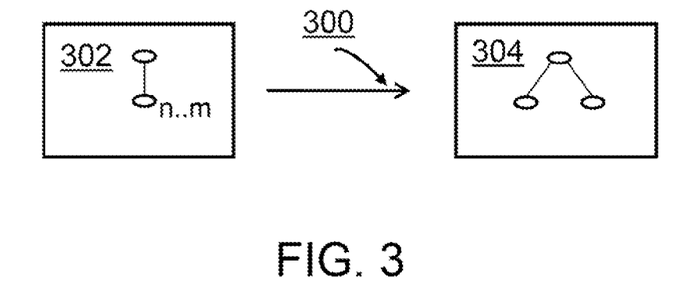
FIG. 3 illustrates an instantiation of an embodiment of a service definition, according to one embodiment.

FIG. 3 may illustrate an instantiation 300 of a virtual machine, i.e., the creation of a virtual machine or service instance 304 based on a template 302. Defined mappings may link the virtual machine to physical computing resources.

Figure 4:
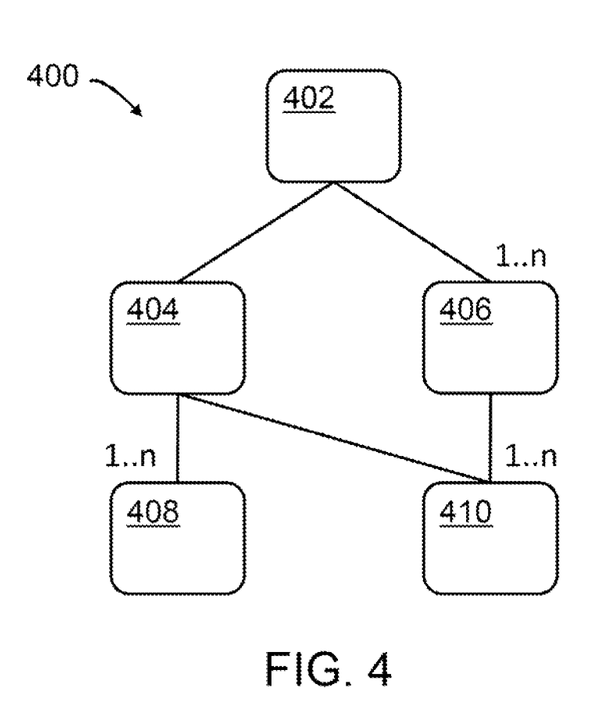
FIG. 4 illustrates a block diagram of a template-level configuration, according to one embodiment.

FIG. 4 may illustrate components of a template-level configuration-management data structure or model 400. Included in the exemplary data structure is a server, 402, an operating system 404, one or more storage devices 406—indicated by "1 . . . n," with one or more attached storage volumes 410, indicated by "1 . . . n." Additionally, one or more—indicated by "1 . . . n," IP addresses 408 may be provided to reach the system via network interface (not shown). There may also be topology information (i.e., links and dependencies between the components) stored in the data structure.

Figure 5:
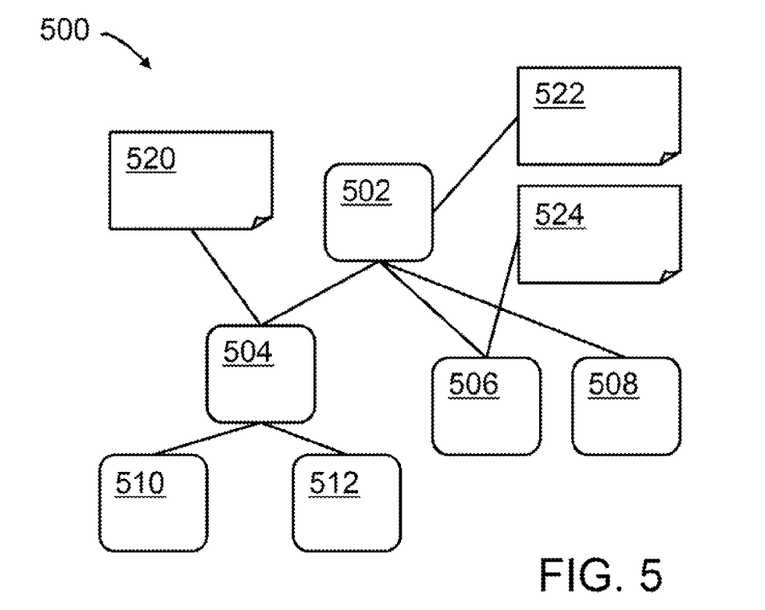
FIG. 5 shows a block diagram of a customized-level configuration, according to one embodiment.

FIG. 5 shows a block diagram of an embodiment of a customized-level configuration 500. In this data structure more details are visible if compared to the template-level data structure of FIG. 4. A computer 502 may have a related operating system 504, storage devices 506 and 508. The operating system may employ two IP interfaces or other non-standardized elements 510 and 512. Additionally, there may be policies attached to this configuration-management data structure in form of user information 520, accounting information 522, and security policies 524. Also topology information may be stored in this configuration-management data structure.

Figure 6:
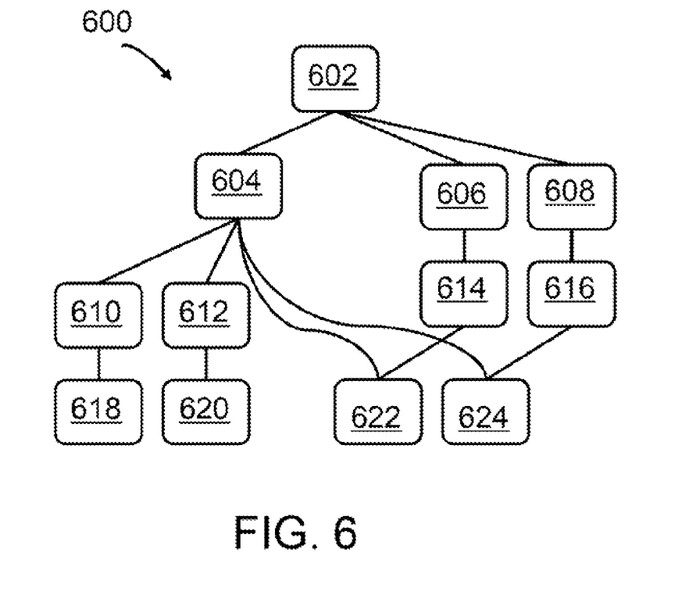
FIG. 6 shows a block diagram of a discovery-level configuration, according to one embodiment.

FIG. 6 shows an exemplary embodiment of a discovery-level configuration-management topology 600. Here, the computer system 602 may be linked to an operating system 604 and two storage adapters 606 and 608. Attached to the operating system 604 there may be network interfaces 610, 612. Again linked to network interfaces 610, 612 may be two IP addresses 618, 620. However, the operating system 604 may also control two storage volumes 622, 624. These storage volumes 622, 624 may also be linked to the storage adapters 606, 608 via storage devices 614 and 616.

Thus, three simple levels of configuration-management data structures have been described as examples. More complex structures are possible on every level. And indeed, in real-life, installations may be far more complex.

Figure 7:
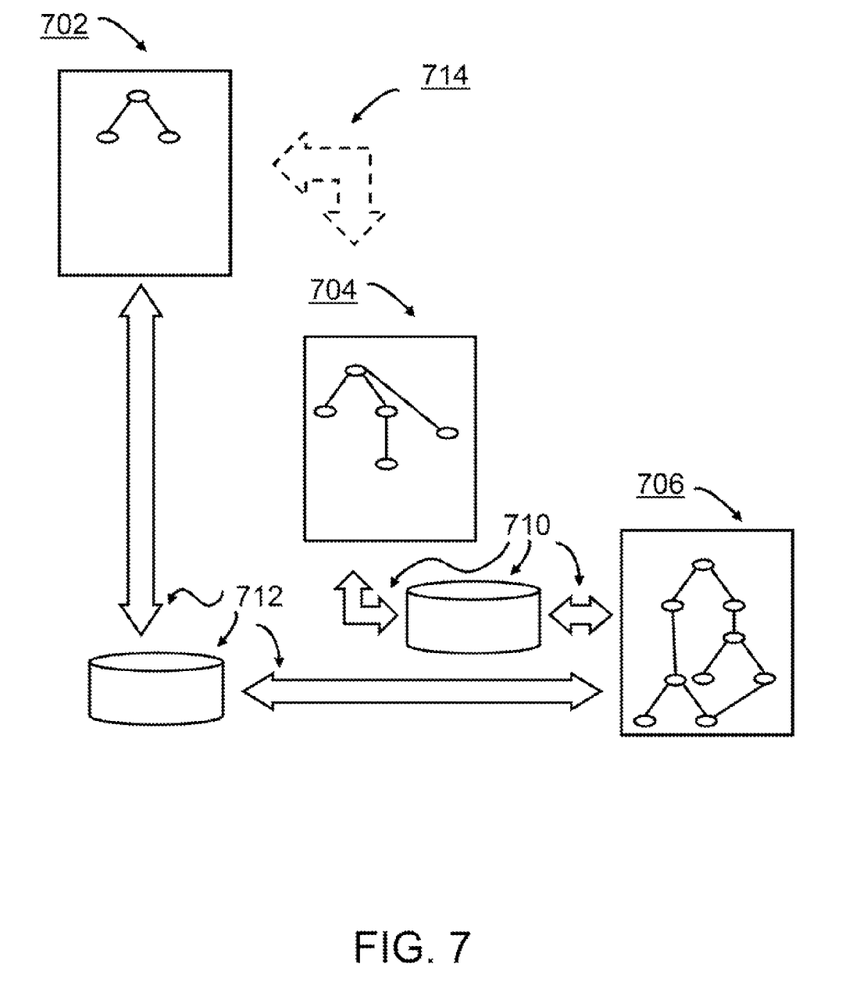
FIG. 7 illustrates different mappings of configuration-management data structures, in some embodiments.

FIG. 7 may illustrate different mappings of configuration-management data structures. Illustrated may be again three levels of configuration-management data structures 702, 704, 706 at different abstraction levels, e.g., a template-level, a customized-level and a detailed level, as already described in FIG. 2. The arrows and the mapping symbol 710 may indicate a mapping of the discovery-level configuration-management data structures 706 to the customized-level configuration-management data structures. As discussed above, the customized-level configuration-management data structures may describe a situation in an enterprise that may manage the IT environment with the help of a systems-management tool.

If a new overlay systems-management tool is introduced, it may have a template-level configuration-management data structure which may not be a mapping from the new template-level configuration-management data structure to the customized-level configuration-management data structures. However, because the discovery-level configuration-management data structures may be known because they may be standardized, a mapping between the template-level configuration-management data structures and the discovery-level configuration-management data structures may be available instantly as indicated by the reference numerals 712. Such a mapping may be implemented as part of the initial design process of the configuration-management data structures of a new systems-management system.

What may not be known is a mapping between the customized-level configuration-management data structures 704 to the template-level configuration-management data structures 702. Thus, a reliable control may not be possible. However, the method as described above may allow an inductive determination of a third mapping 714 of the template-level configuration-management data structures 702 to the customized-level configuration-management data structures 704. With such a method, a much easier introduction of new systems-management tools may be implemented because no manual task may be required in order to find a mapping between the customized-level configuration-management data structures 704 and the template-level configuration-management data structures 702.

Figure 8:
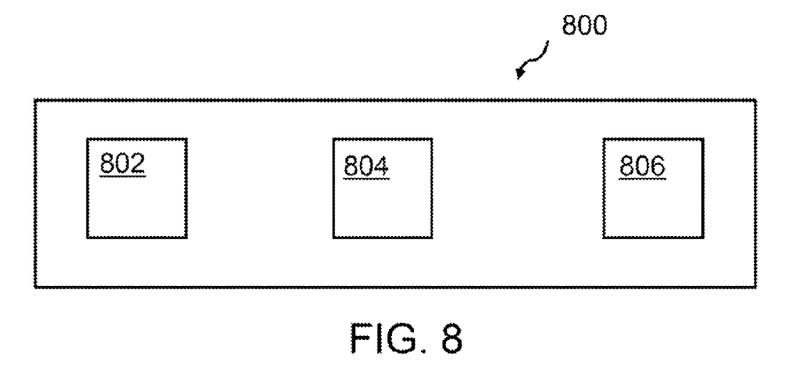
FIG. 8 illustrates a block diagram of a mapping engine, according to one embodiment.

FIG. 8 may show an embodiment of data structures of the mapping engine 800 of management of configuration-management data structures of computing resources. The configuration-management data structures may have different abstraction levels, wherein the abstraction levels may comprise at least a template-level, a customized-level, and a discovery-level, and wherein each of the configuration-management data structures may comprise at least one configuration-management data structure component not available in the other configuration-management data structures. The mapping engine may comprise a mapping unit 802, which has logic adapted for mapping the template-level configuration-management data structure to the discovery-level configuration-management data structure by a first mapping, using mapping information included in the template-level configuration-management data structure, another mapping unit 804, which has logic adapted for mapping the customized-level configuration-management data structure to the discovery-level configuration-management data structure by a second mapping, using mapping information included in the customized-level configuration-management data structure, and a determining unit 806, which has logic adapted for determining a third mapping between the template-level configuration-management data structure and the customized-level configuration-management data structure using the first mapping and the second mapping. Of course, all or some of the logic described above may be included in a single unit, according to some approaches.

Figure 9:
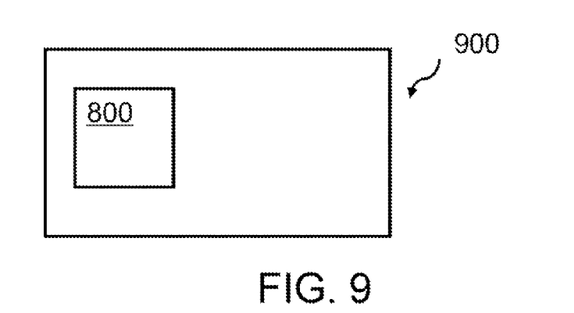
FIG. 9 illustrates a block diagram of a systems-management system, according to one embodiment.

FIG. 9 shows an embodiment of a systems-management system which comprises the mapping engine 800. Conventional systems-management systems typically do not include the mapping engine 800 whereas the systems-management systems 900 described herein may comprise the mapping engine 800, which as previously described, may include any or all of the logic described in accordance with FIG. 8.

Figure 10:
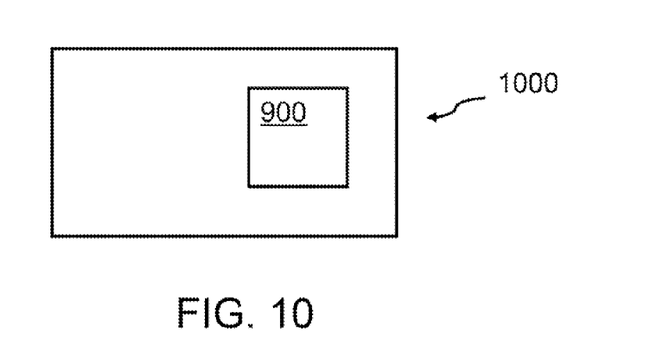
FIG. 10 shows a block diagram of a computer comprising a systems-management system, in one embodiment.

FIG. 10 may show an embodiment of a computer system 1000 comprising the systems-management system 900. Alternatively, the mapping engine may be comprised by a computer system as described in the context of FIG. 13.

Figure 11:
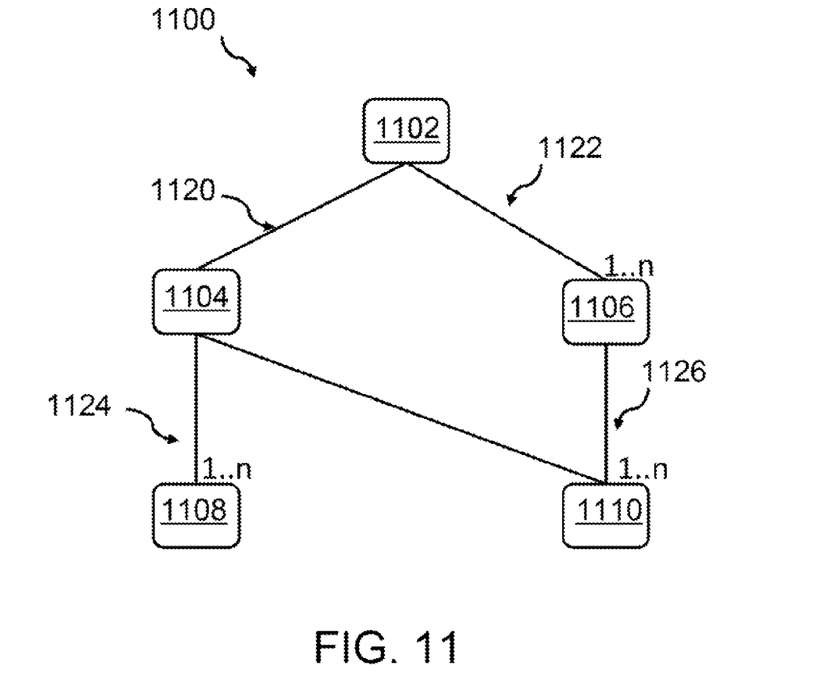
FIG. 11 illustrates elements of a meta language applied by a method, according to one embodiment.

FIG. 11 may show an embodiment of using components of a meta language for defining relationships between the template-level configuration-management data structure elements 1100. In particular, the reference numerals may indicate the following elements. The exemplary configuration-management data structure may be the same as already described in FIG. 4:

| Reference Numeral | From FIG. 4 | Meaning |
|---|---|---|
| 1102 | Server | cmd\\ComputerSystem |
| 1104 | operating system | cmd\\OperatingSystem |
| 1106 | storage device | cmd\\StorageDevice |
| 1108 | IP address | cmd\\IPv4Address |
| 1110 | Volume | cmd\\StorageVolume |

The interrelationships or topology between data structure components may be described by the following elements:

| Reference Numeral | Meaning |
|---|---|
| 1120 | {installedOn} |
| 1122 | {appliesTo}StorageAdapter{attachedOn} |
| 1124 | {contains}NetworkInterface{bindsTo} |
| 1126 | {contains} |

Moreover, the configuration-management data structure may include the information about additional details, e.g., in the following form:

hwModel=cdm:\\ComputerSystem.Mode
location=cdm:\\Computer.Site
costCenter=cdm:\\Computer {asset} Asset.Account,
wherein "hwModel" may refer to a model of a hardware system, the term "location" may refer to the physical location where the hardware system may be located, and the term "costCenter" may denote the cost center responsible for cost related to the hardware system. Of course, the examples given should be understood as example. Many other parameters are possible and optional.

Figure 12:
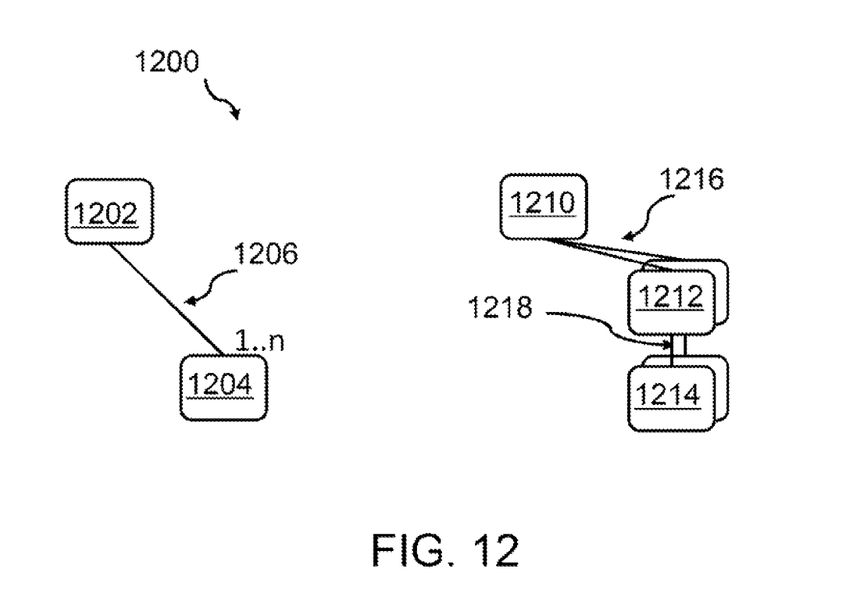
FIG. 12 illustrates elements of a meta language used by the method, according to one embodiment.

FIG. 12 illustrates embodiments of the additional meta language elements, in particular from a topology of the customized-level 1200.

In parallel to the language elements as described in FIG. 11, the meaning may here be interpreted by:

| Reference Numeral | From FIG. 5 | Meaning |
|---|---|---|
| 1202 | Server | cmd\\ComputerSystem |
| 1204 | storage device | cmd\\StorageDevice |
| 1210 | computer system | — |
| 1212 | storage adapter | — |
| 1214 | storage device | — |

It should be noted that server 1202 and storage device 1204 may be related to a customized-level configuration-management data structure, whereas the computer systems 1210, the storage adapters 1212 and the storage devices 1214 may be related to a discovery-level configuration-management data structure.

The interrelationships or topology between data structure components may be described by the following elements:

| Reference Numeral | Meaning |
|---|---|
| 1206 | {appliesTo}StorageAdapter{attachedOn} |
| 1216 | appliesTo |
| 1218 | attachedON |

From this comparison of data structure elements it is clear that the configuration-management data structure of different abstraction levels may not be straight forward to compare and to map. A complex mapping involving the first mapping and the second mapping as described herein may be preferred.

Figure 13:
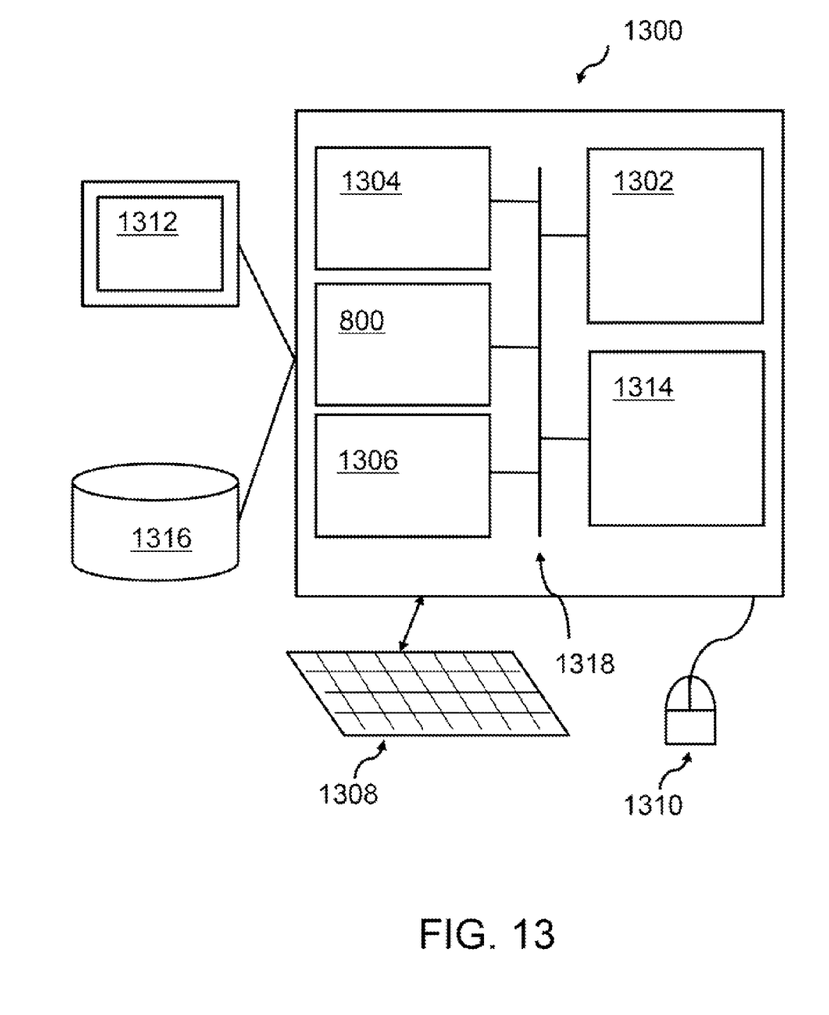
FIG. 13 shows a computer system comprising a mapping engine, according to one embodiment.

Embodiments may be implemented on virtually any type of computer, regardless of the platform being used suitable for storing and/or executing program code. For example, as shown in FIG. 13, a computer system 1300 may include one or more processor(s) 1302 with one or more cores per processor, associated memory elements 1304, an internal storage device 1306 (e.g., a hard disk, an optical drive such as a compact disk (CD) drive or digital video disk (DVD) drive, a flash memory stick, etc.), and numerous other elements and functionalities, typical of today's computers (not shown). The memory elements 1304 may include a main memory, e.g., a random access memory (RAM), employed during actual execution of the program code, and a cache memory, which provides temporary storage of at least some program code or data in order to reduce the number of times, code may be retrieved from external bulk storage 1316 for an execution. Elements inside the computer 1300 may be linked together by use of a bus system 1318 with corresponding adapters. Additionally, a mapping engine 800 may be attached to the bus system 1318.

The computer system 1300 may also include input devices, such as a keyboard 1308, a mouse 1310, or a microphone (not shown). Furthermore, the computer 1300 may include output devices, such as a monitor 1312 (e.g., a liquid crystal display (LCD), a plasma display, an LCD display utilizing light emitting diode (LED) lighting, a cathode ray tube (CRT) monitor, etc.). The computer system 1300 may be connected to a network (e.g., a local area network (LAN), a wide area network (WAN), such as the Internet or any other similar type of network, including wireless networks via a network interface connection 1314. This may allow a coupling to other computer systems or a storage network or a tape drive. Those, skilled in the art will appreciate that many different types of computer systems exist, and the aforementioned input and output means may take other forms. Generally speaking, the computer system 1300 may include at least the minimal processing, input and/or output means, comprising one or more embodiments of the invention.

Further, those skilled in the art will appreciate that one or more elements of the aforementioned computer system 1300 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a CD, a diskette, a tape, or any other computer readable storage device.

In one embodiment, a computer program product, which may be executed in a data processing system or any other system, includes a computer readable storage medium having computer readable program code embodied therewith, the computer readable program code being configured to: map a template-level configuration-management data structure to a discovery-level configuration-management data structure by a first mapping using mapping information included in the template-level configuration-management data structure, map a customized-level configuration-management data structure to the discovery-level configuration-management data structure by a second mapping using mapping information included in the customized-level configuration-management data structure, and determine a third mapping between the template-level configuration-management data structure and the customized-level configuration-management data structure using the first mapping and the second mapping.

In another embodiment, the computer readable program code may also be configured to define at least one service instance based on data in the template-level configuration-management data structure and/or to store the configuration-management data structures to at least one of: a server system and a configuration-management database.

While the invention has been described with respect to a limited number of embodiments, those skilled in the art, having benefit of this disclosure, will appreciate that other embodiments can be devised, which do not depart from the scope of the invention as disclosed herein. Accordingly, the scope of the invention should be limited only by the attached claims.

It should also be noted that embodiments of the invention have been described with reference to different subject-matter. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified

What is claimed is:

1. A method for configuring management data structures of computing resources, the method comprising:
mapping a template-level configuration-management data structure to a discovery-level configuration-management data structure by a first mapping using mapping information included in the template-level configuration-management data structure;
mapping a customized-level configuration-management data structure to the discovery-level configuration-management data structure by a second mapping using mapping information included in the customized-level configuration-management data structure; and
determining a third mapping between the template-level configuration-management data structure and the customized-level configuration-management data structure using the first mapping and the second mapping;
managing the configuration-management data structures in a systems-management system and storing the configuration-management data structures to a server system; and
wherein the template-level configuration-management data structure has a greatest abstraction level, the discovery-level configuration-management data structure has a lowest abstraction level, and the customized-level configuration-management data structure has an abstraction level between the template-level configuration-management data structure and the discovery-level configuration-management data structure.

2. The method according to claim 1, wherein each of the configuration-management data structures comprise at least one component not available in the other configuration-management data structures.

3. The method according to claim 1, further comprising storing configuration-management data structures to a server system.

4. The method according to claim 1, further comprising storing the configuration-management data structures and related data in a configuration-management database.

5. The method according to claim 1, further comprising defining at least one service instance based on data in the template-level configuration-management data structure.

6. The method according to claim 1, wherein the discovery-level configuration-management data structure is standardized based on a recognized standard.

7. The method according to claim 6, wherein the standard is based on a common information model distributed by an organization which develops standards for use by information technology entities.

8. The method according to claim 1, wherein the first and second mappings apply a meta language describing relationships between different configuration-management data structure components.

9. A system, comprising:
a mapping engine for management of configuration-management data structures of computing resources, the mapping engine comprising:
logic adapted for mapping a template-level configuration-management data structure to a discovery-level configuration-management data structure by a first mapping using mapping information included in the template-level configuration-management data structure;
logic adapted for mapping a customized-level configuration-management data structure to the discovery-level configuration-management data structure by a second mapping using mapping information included in the customized-level configuration-management data structure; and
logic adapted for determining a third mapping between the template-level configuration-management data structure and the customized-level configuration-management data structure using the first mapping and the second mapping, and
wherein the configuration-management data structures are characterized by having different abstraction levels such that the template-level configuration-management data structure has a greatest abstraction level, the discovery-level configuration-management data structure has a lowest abstraction level, and the customized-level configuration-management data structure has an abstraction level between the template-level configuration-management data structure and the discovery-level configuration-management data structure, and
wherein each of the configuration-management data structures comprise at least one configuration-management data structure component not available in the other configuration-management data structures.

10. The system according to claim 9, wherein the first and second mappings apply a meta language describing relationships between different configuration-management data structure components.

11. The system according to claim 9, further comprising logic adapted for storing the configuration-management data structures to a server system.

12. The system according to claim 9, further comprising logic adapted for storing the configuration-management data structures and related data in a configuration-management database.

13. The system according to claim 9, further comprising logic adapted for defining at least one service instance based on data in the template-level configuration-management data structure.

14. The system according to claim 9, wherein the discovery-level configuration-management data structure is standardized based on a recognized standard.

15. The system according to claim 14, wherein the standard is based on a common information model distributed by an organization which develops standards for use by information technology entities.

16. A computer program product for execution in a data processing system, the computer program product comprising a computer readable storage medium having computer readable program code embodied therewith, the computer readable program code comprising:
computer readable program code configured to map a template-level configuration-management data structure to a discovery-level configuration-management data structure by a first mapping using mapping information included in the template-level configuration-management data structure;
computer readable program code configured to map a customized-level configuration-management data structure to the discovery-level configuration-management data structure by a second mapping using mapping information included in the customized-level configuration-management data structure; and computer readable program code configured to determine a third mapping between the template-level configuration-management data structure and the customized-level configuration-management data structure using the first mapping and the second mapping;

define at least one service instance based on data in the template-level configuration-management data structure;

store the configuration-management data structures to at least one of: a server system and a configuration-management database, wherein the customized-level configuration management data structure is decided by a user of a system that is described by the customized-level configuration-management data structure.

* * * * *